United States Patent [19]

Sekine

[11] E Re. 29,427

[45] Reissued Oct. 4, 1977

[54] ELECTRORECORDING PAPER

[75] Inventor: Yoichi Sekine, Katano, Japan

[73] Assignee: Matsushita Electric Industrial Co., Ltd., Osaka, Japan

[21] Appl. No.: 718,989

[22] Filed: Aug. 30, 1976

Related U.S. Patent Documents

Reissue of:

[64] Patent No.: 3,875,023
Issued: Apr. 1, 1975
Appl. No.: 320,820
Filed: Jan. 3, 1973

[30] Foreign Application Priority Data

| | | |
|---|---|---|
| Apr. 5, 1972 | Japan | 47-34762 |
| May 31, 1972 | Japan | 47-54666 |
| Sept. 14, 1972 | Japan | 47-92644 |

[51] Int. Cl.[2] ..... B41M 5/20; G01D 15/34

[52] U.S. Cl. ..... 204/2; 346/135; 427/145

[58] Field of Search ..... 204/2; 346/1, 76 R, 346/135; 219/216, 229, 233; 427/150, 145, 148

[56] References Cited

U.S. PATENT DOCUMENTS

| | | | |
|---|---|---|---|
| 2,528,005 | 10/1950 | Kline | 204/2 |
| 3,299,433 | 1/1967 | Reis | 204/2 |
| 3,411,948 | 11/1968 | Reis | 117/217 |
| 3,434,878 | 3/1969 | Reis | 117/217 |
| 3,518,038 | 6/1970 | Spatz | 204/2 |
| 3,772,159 | 11/1973 | Sakata et al. | 204/2 |

*Primary Examiner*—T. M. Tufariello
*Attorney, Agent, or Firm*—Stevens, Davis, Miller & Mosher

[57] ABSTRACT

A recording paper having a color-developing layer containing a component capable of being colored or discolored by application of heat which has been made electroconductive by incorporation of an electro-conductive substance. When an electric current is applied to the color-developing layer, the recording paper selectively gives a visible record at a portion of the color-developing layer to which the electric current has been applied.

15 Claims, 5 Drawing Figures

ELECTRORECORDING PAPER

Matter enclosed in heavy brackets [ ] appears in the original patent but forms no part of this reissue specification; matter printed in italics indicates the additions made by reissue.

This invention relates to a recording paper capable of converting an electric signal directly to a visible image.

Processes for converting electrical signals directly to visible images have quickly been diversified in recent years, and processes which are practiced at present are ink recording, photochemical recording, electrolytic recording, thermal recording and dry discharge recording processes. These processes, however, individually have their merits and demerits. Recording paper for use in the said processes are desirably such that they are usable in the light, can give records high in gradation at a high speed, are stably storable without discoloration or fading, are inexpensive, and require no such operation as exchange of heads or injection of inks.

As a recording paper which can substantially satisfy the above-mentioned conditions, there has been proposed an electrorecording paper. This recording paper has a color-developing layer containing a component capable of being colored or discolored by application of heat. When an electric current is applied to the color-developing layer, the said coloring component is colored due to the heat energy emitted at the time of application of electric current to give a visible record at a selective portion of the color-developing layer to which the electric current has been applied. Generally, the above-mentioned recording paper is prepared by providing an electroconductive layer on a support, and then forming a color-developing layer on the surface of the electroconductive layer.

The electrorecording paper has such characteristics as mentioned below over a spark destructive recording paper, which is similar in structure thereto and which can be subjected to high speed recording.

That is, the spark destruction recording paper is prepared by forming a colored layer, an electroconductive layer composed of carbon- or metal-deposited film, and a shielding layer in this order on a support. This recording paper is of such a type that the shielding layer and the electroconductive layer are removed by discharge to make the lower colored layer visible. Accordingly, a large amount of pigment is required in order to shield the electroconductive layer and the colored layer, with the result that the generation of offensive odor and the formation of recording dregs are necessarily brought about due to discharge at the time of recording.

In contrast to this, the aforesaid electrorecording paper is of such a type that when an electric current is applied, a colored or discolored record is formed in the color-developed layer itself, and hence has such characteristics that no colored layer or shielding layer is required, and the generation of offensive odor or fume or the formation of recording dregs is scarcely brought about at the time of recording so that there is no such fear that the equipments used are stained. Moreover, this recording paper is a dry recording paper, and hence has such characteristics that it does not require any such preservation vessel as required in the case of wet recording paper and is scarcely affected by temperature and humidity, and that it can always be subjected to recording under definite conditions.

Despite the above-mentioned characteristics, the electrorecording paper has such drawback that when an electric current is applied from a recording needle electrode to the color-developing layer, a partial discharge takes place between the recording needle electrode and the electroconductive layer, with the result that there is obtained in the color-developing layer only a recorded mark having an area smaller than the contact area of said layer with the recording needle electrode, and thus the recorded mark is lowered in visible density.

The present invention aims to improve the said electrorecording paper so as to dismiss such drawbacks as mentioned above.

That is, the present invention provides such electrorecording paper that the color-developing layer of the recording paper has been rendered electroconductive to avoid the occurrence of discharge at the time of application of electric current, thereby giving a record faithful to the trace of recording needle electrode.

More particularly, the recording paper of the present invention is characterized in that an electroconductive substance has been dispersed in the color-developing layer thereof formed by dispersing in a binder a component capable of being colored by application of heat.

In the case of the recording paper of the present invention, an electric current flows through the electroconductive substance in the color-developing layer, so that the electroconductive substance generates heat and the coloring component around the electroconductive substance is colored due to the generated heat energy to give a visible record. Accordingly, the addition of the electroconductive substance results in such advantages that the recording voltage can be made lower and, since the electric current flows through the electroconductive substance without occurrence of discharge, a record having an area substantially identical with the contact area of the recording needle with the recording paper can be obtained, and thus the recorded image is increased in visible density.

The recording paper of the present invention is explained in more detail below with reference to the accompanying drawings.

Figure 1:
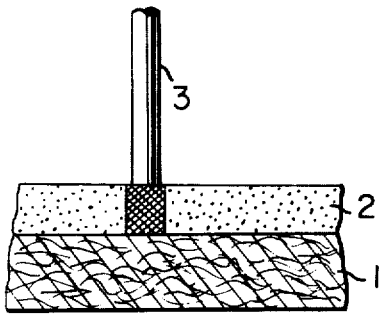
FIG. 1 is a drawing showing the fundamental structure of the recording paper according to the present invention.
Figure 2:
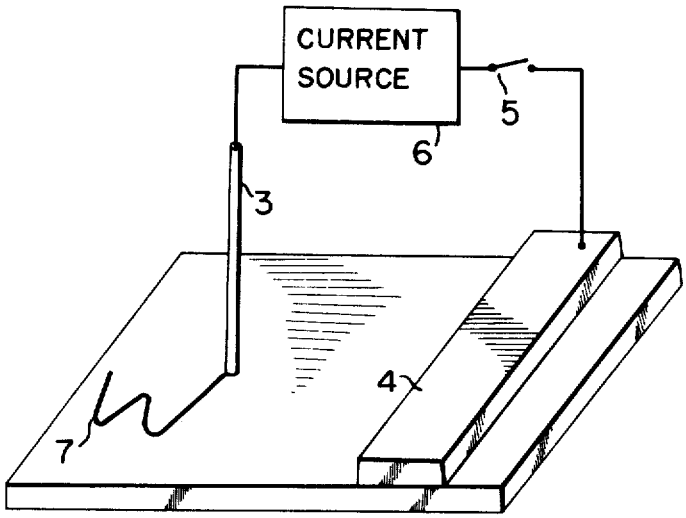
FIG. 2 is a drawing showing the manner of recording an image on the recording paper.

In FIGS. 1 and 2, 1 is a support which is a paper, cloth, glass or plastic film; 2 is color-developing layer which develops a color to give a visible image due to the heat energy generated in response to an electric signal, and has been formed by dispersing in a binder fine particles of a component capable of being colored by application of heat and an electroconductive substance; 3 is a recording needle electrode; and 4 is another electrode faced to the electrode 3. When a switch 5 is closed, an electric current flows between the two electrodes through the color-developing layer 2 from an alternating or direct current source 6 in an amount corresponding to the electric signal desired to be recorded, whereby a colored record 7 is obtained in the electroconductive portion of the color-developing layer 2.

Figure 3:
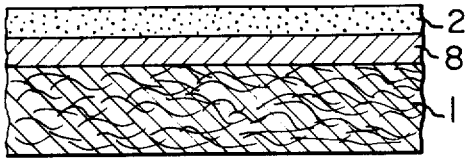
FIGS. 3 to 5 are drawings showing other structures of the recording paper.

FIG. 3 shows another structure of the recording paper of the present invention in which an electroconductive layer 8 has been disposed between the support 1 and the color-developing layer 2. The electroconductive layer 8 is composed of a metal-deposited film, cuprous iodide layer or carbon-coated layer, and is made higher in electric conductivity than the color-developing layer 2. Preferable surface resistivity of this layer is $10^4\ \Omega$ or less at a temperature of 20° C. and a relative humidity of 65%.

Figure 4:
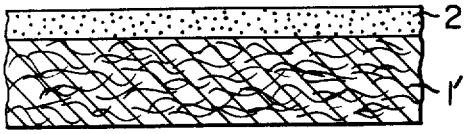

FIG. 4 shows a structure of the present recording paper in which the color-developing layer 2 has been formed on an electroconductive support 1' such as a carbon fiber- or carbon powder-incorporated paper. Preferable surface resistivity of the support 1' in $10^4\ \Omega$ or less.

Figure 5:
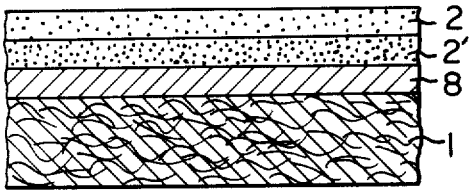

FIG. 5 shows a structure which is fundamentally identical with that shown in FIG. 3 but is different therefrom in that a second color-developing layer 2' has been formed between the color-developing layer 2 and the electroconductive layer 8. The color-developing layer 2' contains no electroconductive substance, and is composed of fine particles dispersed in a binder of a component capable of being colored by application of heat.

In the color-developing layer 2, to which no electroconductive substance has been added, the absolute amount of color-forming component tends to become small, so that there are some cases where the density of recorded image is not satisfactory. The recording paper of the structure shown in FIG. 5 has, below the color-developing layer 2, the second color-developing layer 2' containing no electroconductive substance, and hence has such effect that the color-developing layer 2' develops a color due to the electric current flowed from the color-developing layer 2 to the electroconductive layer 8 through the color-developing layer 2', whereby the density of recorded image is increased.

The materials used in the present invention, i.e., the thermorecording material capable of forming a color by application of heat, the electroconductive substance, and the binder, are explained below.

1. THERMORECORDING MATERIAL

This material develops a color by utilization of the heat energy generated at the time of application of electric current. As such material, there is one which has utilized the development of color due to formation of a reaction compound of an electron donor with an electron acceptor. For example, ferric stearate as the electron donor and pyrogallol as the electron acceptor are independently dispersed in a binder, and the binder is softened by application of heat to melt the ferric stearate, whereby a record can be obtained. The record obtained in this case is a dark brown record. As such thermorecording material, there is used the combination of a leuco body of such a triphenylmethane type dye as Crystal Violet Lactone or a leuco body of a fluoran type dye with an organic acid or a phenolic acidic substance, or the combination of an organic compound having metal ions with an organic spot reagent. There is adopted the procedure that the said dye and organic acid, or said organometallic compound and organic spot reagent, are independently dispersed in a binder.

a. Color-forming dye

Generally, the color-forming dye used is a leuco body of triphenylmethane type dye represented by the below-mentioned general formula (I) or a leuco body of fluoran type dye represented by the below-mentioned general formula (II).

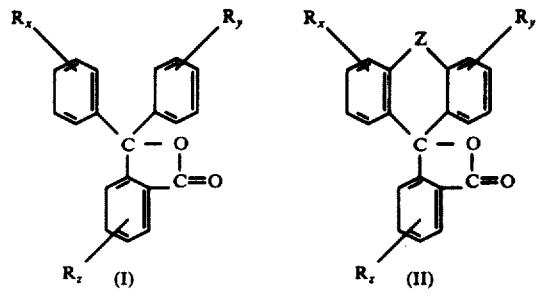

wherein $R_x$, $R_y$ and $R_z$ are individually a hydrogen or halogen atom, or a hydroxyl, alkyl, nitro, amino, dialkylamino, monoalkylamino or aryl group; and Z is an atom necessary to form a heterocyclic ring, and is O. [or S]

Concrete examples of the above-mentioned compounds are as shown below.

Compounds of the formula (I):

3,3-Bis(p-dimethylaminophenyl)-phthalide
3,3-Bis(p-dimethylaminophenyl)-6-dimethylaminophthalide (Crystal Violet Lactone)
3,3-Bis(p-dimethylaminophenyl)-6-aminophthalide
3,3-Bis(p-dimethylaminophenyl)-6-nitrophthalide
3,3-Bis(p-dibutylaminophenyl)-phthalide
3,3-Bis(p-dimethylaminophenyl)-4,5,6,7-tertrachlorophthalide Compounds of the formula (II):

3-Dimethylamino-6-methoxyfluoran
7-Acetamino-3-dimethylaminofluoran
3-Dimethylamino-5,7-dimethylfluoran
3-Diethylamino-5,7-dimethylfluoran
3,6-Bis-β-methoxyethoxyfluoran
3,6-Bis-β-cyanoethoxyfluoran Other lactam compounds:

9-p-Nitroanilino-3,6-bis(diethylamino)-9-xanthenyl-o-benzoic acid lactam (Rhodamin B lactam)
9-p-Nitroanilino-3,6-bis(dimethylamino)-9-thioxanthenyl-o-benzoic acid lactam The above-mentioned dye bases are effectively used. They are scarcely soluble in water, and can be pulverized to fine particles of less than 10 microns in size.

b. Coupler

Preferable as the coupler capable of forming a dye by chemical reaction with the color-forming dye mentioned in the preceding item (a) is a phenolic compound or an organic acid. It is desirable that the said compound or acid is solid at room temperature and can liquefy or vaporize at above 70° C.

i. Examples of the phenolic compound are as follows:

3,5-Xylenol, thymol, 4-tert-butylphenol, 4-hydroxyphenoxide, methyl-4-hydroxybenzoate, 4-hydroxyacetophenone, α-naphthol, β-naphthol, catechol, hydroquinone, resorcinol, 4-tert-octylcatechol, 4,4'-sec-butylidenediphenol, 2,2'-dihydroxydiphenyl, 2,2'-methylenebis(4-methyl-6-tert-butylphenol), 2,2'-bis(4-hydroxyphenyl)-propane, 4,4'-isopropylidenebis-(2-tert-butylphenol), 4,4'-sec-butylidenediphenol, pyrogallol and 4,4'-isopropylidenediphenol.

ii. Examples of the organic acid are as follows:

Stearic, gallic, benzoic, salicylic, succinic, 1-hydroxy-2-naphthoic, 2-hydroxy-p-toluic, o-hydroxybenzoic, m-hydroxybenzoic, p-hydroxybenzoic and 4-hydroxyphthalic acids.

c. Organic spot reagent and organic metal salt

The organic spot reagent referred to herein is a compound capable of being colored or discolored by reaction with metal ions. At present, a large number of such compounds are known. In the present invention, however, there is utilized the phenomenon that at least one of the organic spot reagent and the metal used in combination therewith is melted due to the heat energy generated at the time of application of electric current and the two react with each other to form a color. It is therefore desirable that one of the two which is lower in melting point is solid at below 70° C. and has a melting point of 150° C. or less. In this respect, metallic soap is most preferable as the organic metal salt. Combinations of the organic spot reagent and the metal are as follows:

i. Organic spot reagent: Metal:

Diphenylthiocarbazide: Cu, Fe, Mg or Hg
Dimethylglyoxime: Cu, Fe or Ni
Benzoinoxime: Cu
8-Hydroxyquinoline: Cd, Cu, Fe, Pb, Mn, Ni or Zn
Dinitrophenylcarbazide: Cd
Rhodanine: Cu or Hg
Diphenylthiocarbazone: Cu, Ba, Co, Fe, Pb, Hg or Zn
Diphenylcarbazone: Co, Cu, Pb, Mg, Mn, Hg, Ni or Zn
Dithiooxamide: Co, Cu, Pb or Ni
2-Mercapto-4-phenylthiazole: Co or Pb
3,5-Dimethylpyrazole: Co
α-Naphthylamine-dithiocarbamic acid: Co or Fe
Benzoinoxime: Cu
Benzidine: Cu, Pb or Mn
p-Dimethylaminobenzylidene rhodanine: Cu, Fe, Mg or Hg
Salicylaldoxime: Cu or Pb
Triphenyl thiophosphate: Ni
p,p'-Tetramethyl-diaminodiphenylmethane: Pb or Mn
Anthranilic acid: Zn
Diphenylbenzine: Zn
Catechol: Fe
Gallic acid: Fe
Dihydroxynaphthalene: Fe
Alizarine: Cu
Quinalizarin: Cu ii. Organic metal salt:

As the organic metal salt, a metallic soap having the aforesaid metal ions is effective. Typical examples of the combinations of organic sport reagents with organic metal salts, and color tones of colors developed by use of said combinations, are shown below.

Organic spot reagent: Organic metal salt (Color tone of developed color)

Dimethylglyoxime: Nickel stearate (Pink)
Benzoinoxime: Copper myristate (Yellowish green)
Dithiooxamide: Nickel stearate (Purple)
8-Hydroxyquinoline: Iron oleate (Black)
Gallic acid: Ferric stearate (Black)
Alizarin: Copper oleate (Purplish red)
Quinalizarin: Copper oleate (Purplish red)
Diphenylcarbazone: Copper stearate (Red)
Diphenylcarbazone: Cadmium stearate (Red)
Diphenylcarbazone: Copper myristate (Purple)
Diphenylcarbazone: Zinc palmitate (Deep red)
Diphenylthiocarbazide: Mercuric stearate (Purple)
Diphenylthiocarbazide: Lead myristate (Deep red)

d. It has been found that [s] *a* substance, which has heretofore been known as redox indicator, forms a color in the vicinity of recording needle at the time of application of electric current, and it has been confirmed that said substance is effective as a color-forming material for use in electrorecording paper. The redox indicator referred to herein is a substance which is colored or discolored due to oxidation with the heat generated at the time of application of electric current, and is a leuco body is preferable in view of the whiteness of the background. Examples of the redox indicators used in the present invention, and color tones of colors developed by said indicators, are shown below.

Leucoethyl Nile Blue (Blue)
Leucomethyl Capryl Blue (Blue)
Leucotoluidine Blue (Purple)
Leucodiphenylamine (Purple)
Leuco-N-methyldiphenylamine-p-sulfonic acid (Reddish purple)
Leucophenylanthranilic acid (Reddish purple)
Triphenyltetrazolium chloride (Red)
Methylviologen (Purple)
Leucosafranine T (Red)
Leucoindigosulfonic acid (Blue)
Leucophenosafranine (Red)
Leucomethylene Blue (Blue)
Leucodiphenylbenzidine (Purple)
Leucoerioglucine A (Yellowish green to Red)
Leuco-p-nitrodiphenylamine (Purple)
Leucodiphenylamine-o,o'-diphenylcarboxylic acid (Bluish purple)

2. ELECTROCONDUCTIVE SUBSTANCE

The electroconductive substance used in the present invention is a material which is incorporated into the color-developing layer of recorder paper to impart electroconductivity to said layer. In order to obtain a record faithful to the trace of recording needle without any discharge at the time of recording and at a voltage as low as possible, the surface resistivity of the color-developing layer is required to be $10^7$ Ω or less at a temperature of 20° C. and a relative humidity of 65%. It is desirable that the electroconductive substance, which is to be incorporated into the color-developing layer, is [scarely] *scarcely* affected in electric conductivity by temperature and humidity, and is transparent and white or pale-colored so that the resulting recorded image can be enhanced in contrast. In order to lower the voltage at the time of recording to make it possible to carry out the recording at an alternating current voltage of less than 1.5 KV., the resistivity of the electroconductive substance is desirably $10^4$ Ω cm. or less. As such electroconductive substance, there is used a known semiconductor which is white or pale-colored, or a material prepared by coating an electroconductive film on the surface of a powder comprising a white or pale-colored substrate.

Electroconductive substances preferable for use in the recording papers of the present invention are shown below.

a. Cuprous iodide

Cuprous iodide is obtained as a transparent or pale yellow compound, and hence is most preferable as the [electroncudctive] *electroconductive* substance used in the present invention. It is desirable that a recording paper satisfies such demand that it does not give an impression of specific paper but is undistinguishable in appearance from ordinary paper. When cuprous iodide is used as the electroconductive substance to be incorporated into the color-developing layer, it is possible to obtain a recording paper which can satisfy the above-mentioned demand. Even when an image recorded on the present recording paper containing cuprous iodide as the electroconductive substance is subjected to copying by use of a transmitted light, the cuprous iodide does not bring about any injury at all. In case the cuprous iodide is used to form the electroconductive layer 8 in the case where the recording paper has such a structure as shown in FIGS. 3 or 5, an image recorded on the recording paper can be reproduced by utilization of a transmitted light.

Cuprous iodide is prepared, for example, in the following manner:

500 Cubic centimeters of a 30% aqueous potassium iodide solution is mixed under stirring with 500 cc. of a 15% aqueous copper sulfate solution to deposit a precipitate. This precipitate is separated by centrifuge and then washed 5 to 6 times with water, whereby white powder cuprous iodide to obtained in a high yield. This powder is dried and measured in resistivity at room temperature to obtain a value of 2 to 4 Ω cm. Cuprous iodide is scarely soluble in water and organic solvents.

b. Tin dioxide

Tin dioxide is a white powder insoluble in water and organic solvents. In the examples shown later was used tin dioxide having a resistivity of $2.3 \times 10^3$ Ω cm.

This tin dioxide can be lowered in resistivity when antimony is diffused therein. For example, 50 g. of the above-mentioned tin dioxide is mixed with 20 cc. of a 10% methanol solution of antimony trichloride, and the resulting mixture is dried at 60° C. and then calcined for about 30 minutes in an electric furnace at 300° to 400° C. to obtain tin dioxide. The thus obtained tin dioxide having antimony diffused therein is a pale blue powder and has a resistivity of 20 to 40 Ω cm.

c. Silver iodide

An aqueous potassium iodide solution is mixed with an aqueous silver nitrate solution, and the resulting mixed solution is stirred to deposit a pale yellow precipitate. This precipitate is recovered by filtration, washed 2 to 3 times with water, and then dried to obtain silver iodide having a resistivity of $7.8 \times 10^3$ Ω cm.

d. Other electroconductive substance:

A transparent and white or pale-colored substance, which itself has no electric conductivity but is pulverizable into fine particles of less than about 20 microns, may also be used by coating on the surface thereof a "Nesa" ($SnO_2$ + Sb) film or a zinc- or aluminum-deposited film.

An example of procedure for preparing silica gel coated with a "Nesa" film is explained below.

To a mixed solution comprising 150 cc. of water, 50 cc. of methanol and 20 cc. of 35% hydrochloric acid are added 100 g. of tin tetrachloride, 3 g. of antimony trichloride and 500 g. of silica gel, and the resulting mixture is pulverized in a ball mill for 24 hours to form a dispersion. This dispersion is dried at 100° C. and then calcined for 10 minutes in an electric furnace at 600° C. The calcination product is washed with a 3:1 mixture of water and methanol to remove excess tin tetrachloride and antimony trichloride, and then dried to obtain a white fine powder of silica gel coated with "Nesa" film. The thus obtained powder has a resistivity of $3.5 \times 10^3$ Ω cm.

Alternatively, a white substance such as zinc oxide, titanium dioxide, magnesium carbonate, calcium oxide or lead carbonate is pulverized into particles of 5 to 10 microns, and a vapor of zinc or aluminum is deposited on the particles with stirring, whereby a gray or white fine powder having a resistivity of $2 \times 10^{-1}$ Ω cm. to $10^4$ Ω cm. is obtained. The thus obtained powder may also be used as the electroconductive substance.

3. BINDER

In order to disperse in the state of fine particles the color-forming dye, coupler, organic spot reagent and organic metal salt used in the color-developing layer, and/or the electroconductive substance, and to impart bonding ability thereto, there is used a binder. Since most of the above-mentioned color-forming dye, coupler, organic spot reagent and electroconductive substance are water-insoluble, the use of a water-soluble binder is effective. Further, the water-soluble substance has such characteristic that it is easily handled and treated at the time [or] *of* production of recording paper.

i. Water-soluble binder:

Examples of the water-soluble binder include hydroxyethyl cellulose, carboxymethyl cellulose, methoxy cellulose, polyvinyl alcohol, polyvinyl pyrrolidone, polyacrylamide, polyacrylic acid, gelatin and starch.

As a film-forming binder which is water-soluble and electroconductive, there is a high molecular electrolyte. This electrolyte contributes to the increase in electric conductivity of electrorecording paper, and is effectively used for the purpose of lowering the voltage at the time of recording. The high molecular electrolyte includes such cationic and anionic electrolytes as mentioned below.

a. Cationic high molecular electrolyte:

This electrolyte has a functional group of the formula,

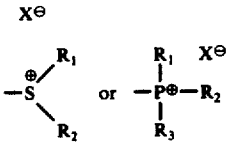

wherein $R_1$, $R_2$ and $R_3$ are individually an alkyl, allyl, aryl, acyl or alkylamino group; and X is a halogen atom.

Concrete examples of the electrolyte are as follows:

Poly-2-acryloxyethyl dimethylsulfonium chloride

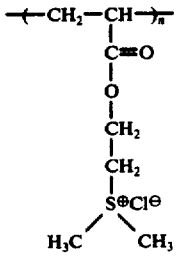

Polyglycidyl tributylphosphonium chloride

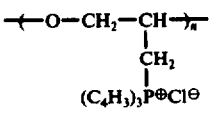

b. Anionic high molecular electrolyte:

This electrolyte has a functional group of the formula,

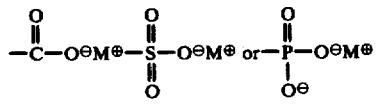

wherein M is an alkali metal or an alkaline earth metal.

Concrete examples of the electrolyte are as follows:

Sodium [polymethylacrylate] *polymethacrylate*

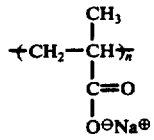

Sodium polystyrenesulfonate

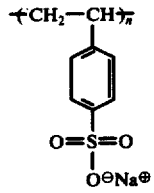

Sodium polyvinylsulfonate

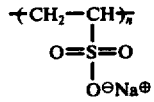

Potassium polyvinylphosphate

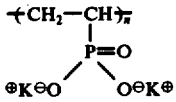

ii. water-insoluble binder:

As the binder, an organic solvent-soluble binder may also be used. In case a binary system comprising, for example, a color-forming dye and a coupler, is used as the thermorecording material of the color-developing layer, the two components should individually be dispersed in the form of fine particles into the binder. If either one of the two components is dissolved in a solvent used to dissolve the binder, a color formation reaction to deprive its function as a recording medium takes place at the time of mixing of the two. Accordingly, solvents for the binder mentioned herein are necessarily limited depending on the kind of color-forming components.

Concrete examples of the water-insoluble binder are natural rubber, synthetic rubbers, chlorinated rubbers, alkyd resins, styrene-butadiene copolymers, polybutyl methacrylate, low molecular weight ethylene polymers, low molecular weight styrene polymers, polyvinyl butyral, phenolic resins and nitrocellulose.

The present invention is illustrated in detail below.

Examples 1 to 6 show recording papers of the structure shown in FIG. 1.

EXAMPLE 1

100 Parts by weight of a 5% toluene solution of a styrene-butadiene copolymer (styrene:butadiene = 85:15) was mixed with 25 parts by weight of ferric stearate, and the resulting mixture was pulverized in a 500 ml. ball mill for 24 hours to prepare a dispersion (liquid A). In the liquid A, the ferric stearate had scarely dissolved and had dispersed in the form of fine particles of less than 5 microns.

On the other hand, 100 parts by weight of a 5% toluene solution of a styrene-butadiene copolymer was mixed with 25 parts by weight of gallic acid, and the resulting mixture was pulverized in a 500 ml. ball mill for 24 hours to prepare a dispersion (liquid B). In the liquid B, the gallic acid had scarcely dissolved and had dispersed in the form of fine particles of less than 5 microns.

Likewise, 100 parts by weight of a 5% toluene solution of a styrene-butadiene copolymer was mixed with 100 parts by weight of cuprous iodide to prepare a dispersion (liquid C).

[Subsequnelty,] *Subsequently,* 15 parts by weight of the liquid A, 15 parts by weight of the liquid B and 100 parts by weight of the liquid C were homogeneously mixed together by means of a mixer to form a liquid D. The liquid D was coated on a white paper having a thickness of about 60 microns by use of a wire bar, which had been so adjusted as to form a film having a dry thickness of 15 microns, and was then dried to obtain an electrorecording paper. The thus obtained recording paper had a pale brown ground having a reflective density of D = 0.05, but was substantially white when observed visually. The surface resistivity of the recording paper was $2.35 \times 10^4 \Omega$. This recording paper was subjected to recording in the manner shown in FIG. 2, using as the recording needle [electroce] *electrode* 3 a tungsten wire of 0.5 mm. in diameter and running the wire at a rate of 540 mm/sec., while applying an alternating current voltage of 300 V. to obtain a dark purple record having a reflective density of D = 0.76. This recording paper could be subjected to copying using a transmitted light.

In the next place, the aforesaid liquids A and B were mixed with each other in a weight ratio of 1:1 to prepare a liquid E. The liquid E was mixed with 100 parts by weight of the aforesaid liquid C, and the resulting mixture was coated on a white paper in the same manner as mentioned previously to obtain a recording paper. This recording paper was subjected to recording under the same conditions as mentioned above. The relation between the amount of the liquid E per 100 parts by weight of the liquid C, the surface resistivity of the recording paper, and the reflective density of the recorded image formed on the recording paper was as shown in the following table:

| Amount of liquid E (parts by weight) | Surface resistivity (Ω) | Reflective density (D) |
|---|---|---|
| 5 | $7.16 \times 10^3$ | 0.13 |
| 10 | $8.80 \times 10^3$ | 0.23 |
| 20 | $1.52 \times 10^4$ | 0.52 |
| 30 | $2.35 \times 10^4$ | 0.76 |
| 40 | $2.82 \times 10^4$ | 0.74 |
| 50 | $4.56 \times 10^4$ | 0.76 |

EXAMPLE 2

A mixture comprising 100 parts by weight of titanium dioxide and 100 parts by weight of acetone was pulverized in a 500 ml. ball mill for 24 hours, filtered and then dried to obtain a fine titanium dioxide powder of less than 5 microns in particle size. Onto this titanium dioxide powder, a vapor of aluminum was deposited by vacuum evaporation under $3 \times 10^{-5}$ torr with shaking, whereby a fine titanium dioxide powder having an aluminum coating was obtained. The specific resistance of this titanium dioxide powder was 5 Ω cm.

100 Parts by weight of the fine titanium dioxide powder, 30 parts by weight of the liquid A used in Example 1, 30 parts by weight of the liquid B used in Example 1, and 100 parts by weight of a 5% toluene solution of a styrene-butadiene copolymer were mixed together with stirring. The resulting mixed liquid was coated to a thickness of 15 microns on a white paper having a thickness of 60 microns, and was then dried to obtain a recording paper.

The thus obtained recording paper was pale gray-colored and had a surface resistivity of $2.8 \times 10^4$ Ω. This recording paper was subjected to recording under the same conditions as in Example 1, whereby a recorded image having a reflective density of D = 0.82 was obtained.

EXAMPLE 3

100 Parts by weight of cuprous iodide was mixed with 100 parts by weight of a 5% aqueous solution of polyvinyl alcohol ("PVA-205" produced by Kuraray Co.), and the resulting mixture was pulverized in a 500 ml. ball mill for 48 hours to prepare a dispersion (liquid A).

In the next place, 200 parts by weight of a 10% aqueous polyvinyl alcohol solution was mixed with 35 parts by weight of 3,3-bis(p-dimethylaminophenyl)-6-dimethylaminophthalide as a color-forming dye, and the resulting mixture was pulverized in a 500 ml. ball mill for 48 hours to prepare a dispersion (liquid B). In the liquid B, the color-forming dye had scarcely dissolved and had dispersed in the form of fine particles of less than 5 microns.

Separately, 200 parts by weight of a 10% aqueous polyvinyl alcohol solution was mixed with 35 parts by weight of 4,4'-isopropylidenediphenol (Bis-phenol A) as a coupler, and the resulting mixture was pulverized in a 500 ml. ball mill for 48 hours to prepare a liquid C. In the liquid C, the coupler had dispersed in the form of fine particles of less than 5 microns.

Subsequently, 10 parts by weight of the liquid B and 100 parts by weight of the liquid C were stirred and mixed together by means of a mixer to prepare a liquid D. In the liquid D, the color-forming dye and the coupler had individually dispersed in the form of fine particles, and it may be said that there was no direct contact between the two particles.

100 Parts by weight of the aforesaid liquid A and 30 parts by weight of the liquid D were stirred and mixed together by means of a mixer. The resulting mixture was coated on the surface of a paper by use of a wire bar, which had been so adjusted as to form a film having a thickness of 15 microns, and was then dried to obtain an electrorecording paper.

This recording paper was subjected to recording in the manner as shown in FIG. 2, using as the recording needle electrode 3 a tungsten wire of 0.25 mm. in diameter and running the wire at a rate of 540 mm/sec. while applying an alternating current voltage of 300 V., whereby a brilliant blue record having a reflective density of 0.86 was obtained.

EXAMPLE 4

60 Parts by weight of the liquid D used in Example 3, 100 parts by weight of the fine silica gel powder coated with a "Nesa" ($SnO_2$ + Sb) transparent film which was stated in item (d) of the paragraph Electroconductive substance and 100 parts by weight of a 5% aqueous polyvinyl alcohol solution were mixed together by means of a mixer. The resulting mixture was coated on a white paper so as to form a film having a dry thickness of 15 microns, and was then dried to obtain an electrorecording paper. The surface resistivity of the thus obtained recording paper was $2.5 \times 10^6$ Ω. This recording paper was subjected to recording in the manner shown in FIG. 2 while applying an alternating current voltage of 1.5 KV., whereby a blue recorded image having a reflective density of D = 0.67 was obtained.

EXAMPLE 5

100 Parts by weight of cuprous iodide, 10 parts by weight of Luecomethylene Blue, and 130 parts by weight of a 1% aqueous gelatin solution were mixed together, and the resulting mixture was pulverized in a ball mill for 24 hours to prepare a dispersion. This dispersion was coated on a white paper and then dried to obtain a white recording paper. An electric current was applied to the thus obtained recording paper, whereby a pale blue record was obtained.

EXAMPLE 6

100 Parts by weight of antimony-diffused tin dioxide, 10 parts by weight of Leucomethylene Blue, and 130 parts by weight of a 1% aqueous gelatin solution were mixed together, and the resulting mixture was pulverized in a ball mill for 24 hours to prepare a dispersion. This dispersion was coated on a white paper so as to form a film having a thickness of 15 microns and was then dried to obtain a pale blue recording paper. An electric current was applied to the thus obtained recording paper, whereby a record having a contrast of 0.32 was obtained.

Examples 7 to 10 set forth below illustrate the cases where the electroconductive layers 8 shown in FIGS. 3 and 5 are formed.

EXAMPLE 7

This example illustrates a procedure of depositing cuprous iodide directly on a support by vacuum evaporation, in which the curpous iodide used was a first grade commerically available product.

An art paper as a support was adhered to the interior of a bell jar. On the other hand, about 0.5 g. of the cuprous iodide was charged into a quartz glass pot, and a tungsten wire of 0.5 mm. in diameter was wound around the pot. When the vapor pressure inside the bell jar had [becomes] *become* $7 \times 10^{-5}$ [toor,] *torr*, an electric current of 10 to 15 mA was applied to the tungsten wire and, after about 10 minutes, the electric current was shut off to complete the vacuum evaporation. The resulting cuprous iodide-deposited paper was white and had a surface resistivity of $5 \times 10^3$ to $2 \times 10^4$ Ω. When exposed to ultraviolet rays of fluorescent lamp and the like, the paper was yellowed but showed no change in resistivity.

EXAMPLE 8

Fine particles of copper were charged into a tungsten basket and were deposited by vacuum evaporation on an art paper under a pressure of $5 \times 10^{-5}$ torr in the same manner as in Example 7. The surface resistivity of the copper-deposited paper was 2 to 3 Ω. This paper was placed in a desiccator containing fine particles of iodine, and was sucked with an aspirator for 15 to 45 minutes, whereby the copper on the paper surface reacted with the iodine to form cuprous iodide, and the red surface of the paper gradually became white. When the suction was further continued, the iodine became excess, and the paper came to be yellowed. The yellowed paper was allowed to stand in air, whereby the excess iodine was gradually released, and the paper became a white paper again. The surface resistivity of the thus obtained paper was $10^3$ to $4 \times 10^3$ Ω.

EXAMPLE 9

100 Cubic centimeters of a 4% aqueous solution of polyvinyl alcohol ("PVA 205" produced by Kuraray Co.) was mixed with 100 g. of cuprous iodide, and the resulting mixture was pulverized in a 500 ml. ball mill for 24 hours to form a dispersion. This dispersion was coated on an art paper by means of a wire bar, which had been so adjusted as to form a film having a thickness of 15 microns, and was then dried to obtain a coated paper. The surface resistivity of this coated paper was (2 to 5) $\times 10^3$ Ω.

Using other water-soluble binders such as hydroxyethyl cellulose, gelatin, carboxymethyl cellulose, polyacrylamide, polyethylene oxide and polyvinyl pyrrolidone, coated papers were prepared in the same manner as above. The thus prepared coated papers were substantially identical in surface resistivity with the coated paper obtained in the above.

EXAMPLE 10

100 Cubic centimeters of a 10% toluene solution of an 85:15 copolymer of styrene and butadiene was mixed with 100 g. of cuprous iodide, and the resulting mixture was pulverized in a 500 ml. ball mill for 24 hours to form a dispersion. This dispersion was coated on an art paper by means of a wire bar, which had been so adjusted as to form a film having a thickness of 15 microns, and was then dried to obtain a coated paper. The surface resistivity of this coated paper was (0.5 to 1) $\times 10^4$ Ω.

EXAMPLE 11

A mixture comprising 25 parts by weight of nickel stearate and 100 parts by weight of a 3% aqueous polyacrylamide solution was pulverized in a ball mill to prepare a dispersion (a). On the other hand, a mixture comprising 25 parts by weight of dimethyl glyoxime and 100 parts by weight of a 3% aqueous polyacrylamide solution was pulverized in a ball mill to prepare a dispersion (b). 30 Parts by weight of the dispersion (a), 30 parts by weight of the dispersion (b), 100 parts by weight of a fine silica gel powder coated with a "Nesa" film, and 100 parts by weight of a 3% aqueous polyacrylamide solution were mixed together. The resulting mixture was coated to a dry film thickness of 8 microns on the electroconductive cuprous iodide layer obtained in Example 1, and was then dried to obtain a pale blue recording paper. This recording paper was subjected to recording under the same conditions as in Example 1, while applying an alternating current voltage of 100 V., whereby a pink record having a reflective density of D = 0.63 was obtained.

| Example 12 | | | |
|---|---|---|---|
| A | 5 % Aqueous hydroxyethyl cellulose solution | 200 | parts by weight |
| | 3,6-Dimethylfluoran | 35 | " |
| B | 5% Aqueous hydroxyethyl cellulose solution | 200 | parts by weight |
| | 1-Hydroxybenzoic acid | 35 | " |
| C | 5 % Aqueous hydroxyethyl cellulose solution | 100 | parts by weight |
| | Cuprous iodide | 100 | " |

The above-mentioned mixtures A, B and C were individually pulverized in a ball mill for 24 hours to prepare liquids A, B and C, respectively. 5 Parts by weight of the liquid A, 50 parts by weight of the liquid B, 200 parts of the liquid C were mixed together under stirring by means of a mixer. The resulting mixture was coated on the cuprous iodide layer of Example 9 so as to form a film having a dry thickness of 8 microns and was then dried to obtain a white recording paper. This recording paper was subjected to recording in the same manner as in Example 1, whereby a record having a reflective density of D = 0.83 was obtained.

EXAMPLE 13

The liquid D of Example 1 was coated on an aluminum-deposited paper so as to form a film having a dry thickness of 10 microns and was then dried to obtain a pale brown recording paper. This recording paper was subjected to recording in the same manner as in Example 1, while applying an alternating current voltage of 40 V., whereby a black record was obtained. When the voltage was increased to 150 V. or more, spark destruction took place to generate fumes as well as to ooze the record.

EXAMPLE 14

100 Parts by weight of amorphous carbon, 10 parts by weight of a low styrene polymer and 100 parts by weight of toluene were mixed together, and the resulting mixture was pulverized in a ball mill for 24 hours to prepare a dispersion. This dispersion was coated on a white paper so as to form a film having a dry thickness of 10 microns, and was then dried to form an electroconductive layer. The surface resistivity of this electroconductive layer was 250 to 500 Ω.

Subsequently, a mixture comprising 10 parts by weight of Leucomalachite Green, 100 parts by weight of silver iodide, 5 parts by weight of sodium polystyrenesulfonate and 130 parts by weight of water was pulverized in a ball mill for 24 hours to prepare a dispersion. This dispersion was coated on the aforesaid electroconductive layer so as to form a film having a dry thickness of 10 microns, and was then dried to obtain a pale yellow recording paper.

The thus obtained recording paper was subjected to recording, while applying a direct current voltage of 70 V., whereby a green record was obtained.

| Example 15 | | | |
|---|---|---|---|
| A | 10 % Aqueous polyvinyl alcohol solution | 100 | parts by weight |
| | Copper palmitate | 25 | " |
| B | 10 % Aqueous polyvinyl alcohol solution | 100 | parts by weight |
| | Diphenylcarbazone | 25 | " |

-continued

| Example 15 | | | |
|---|---|---|---|
| C | 5 % Aqueous polyvinyl alcohol solution | 100 | parts by weight |
| | Cuprous iodide | 100 | " |

The above-mentioned mixtures A, B and C were individually pulverized in a ball mill for 24 hours to prepare liquids A, B and C, respectively. 15 Parts by weight of the liquid A, 15 parts by weight of the liquid B and 100 parts by weight of the liquid C were mixed together under stirring by means of a mixer. The resulting mixture was coated to film thickness of 10 microns on an electroconductive paper containing 40% of carbon fibers and having a surface resistivity of 250 Ω, and was then dried to obtain a recording paper. This recording paper was subjected to recording while applying a voltage of 100 V., whereby a reddish purple record was obtained.

EXAMPLE 16

This example illustrates a recording paper having the structure shown in FIG. 5.

Between the electroconductive cuprous iodide layer and the color-developing layer containing 3,6-dimethylfuoran and p-hydroxybenzoic acid as color-forming components, which layers were formed in Example 12, a 1:10 mixture of the liquid A and B prepared in Example 12 was disposed so as to form a film having a thickness of 3 microns to obtain a white recording paper having the color-developing layer 2' shown in FIG. 5. This recording paper was subjected to recording under the same conditions as in Example 12 to give a brilliant red record having a reflective density of D = 1.21.

What we claim is:

1. An electrorecording paper having a color-developing layer containing a component capable of changing color in response to applied heat, said color-developing layer comprising a heat coloring component and an electroconductive substance, both of which are dispersed in the form of fine particles in a binder; said electroconductive substance being substantially light reflective, electron conductive and having a specific resistance not greater than $10^4$ Ω cm and selected from the group consisting of cuprous iodide, tin dioxide[,] *and* silver-iodide[, and antimony]; and said color-developing layer having a [surfacee] *surface* resistivity of not greater than $10^7$ Ω [cm.] at a temperature of 20° C. and at a relative humidity of 65%; said layer being capable of recording by changing color in response to heat applied by means of an applied electric current.

2. An electrorecording paper according to claim 1, wherein said electroconductive substance is cuprous iodide.

3. An electrorecording paper according to claim 1, wherein said color-developing layer is in contact with a supporting member.

4. A recording paper according to claim 1, wherein the component capable of being colored by application of heat is composed of a leuco body of a triphenylmethane type dye or a leuco body of a fluoran type dye and a phenolic substance or an organic acid.

5. A recording paper according to claim 1, wherein the component capable of being colored by application of heat is composed of a metal salt and an organic spot reagent, which reacts with metal ions of said salt to form a visually observable reaction product, one of said two substances which is lower in melting point having a melting point of 70° to 150° C.

6. A recording paper according to claim 1, wherein the component capable of being colored by application of heat is a redox indicator.

[7. A recording paper according to claim 1, wherein the electroconductive substance is antimony-containing tin dioxide.]

[8. A recording paper according to claim 1, wherein the electroconductive substance is silica gel coated with antimony-containing tin dioxide.]

[9. A recording paper according to claim 1, wherein the electroconductive substance is coated with a metal film.]

10. A recording paper according to claim 3, wherein an electroconductive layer is disposed between the supporting member and the color-developing layer.

11. A recording paper according to claim 10, wherein the electroconductive layer is a layer composed of a [support and a] metal, which has been deposited on the support by vacuum evaporation.

12. A recording paper according to claim 10, wherein the electroconductive layer is composed of cuprous iodide.

13. A recording paper according to claim 12, wherein the electroconductive layer composed of cuprous iodide [is a layer comprising a support and cuprous iodide, which] has been deposited on the support by vacuum evaporation.

14. A recording paper according to claim 12, wherein the electroconductive layer composed of cuprous iodide is a layer comprising particles of cuprous iodide which have been bonded by use of a binder.

15. A recording paper according to claim 10, wherein the electroconductive layer is a layer comprising carbon particles which have been bonded by use of a binder.

16. A recording paper according to claim 3, wherein the support is an electroconductive material.

17. A recording paper according to claim 3, wherein a second color-developing layer formed by dispersing in a binder fine particles of a component capable of being colored by application of heat is disposed between the color-developing layer and the support.

18. A recording paper according to claim 17, wherein an electroconductive layer is disposed between the second color-developing layer and the support.

* * * * *